United States Patent
Kim et al.

(10) Patent No.: US 12,256,036 B2
(45) Date of Patent: Mar. 18, 2025

(54) MOBILE TERMINAL

(71) Applicant: LG ELECTRONICS INC., Seoul (KR)

(72) Inventors: Ilhyun Kim, Seoul (KR); Changhwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/756,383

(22) PCT Filed: Dec. 18, 2019

(86) PCT No.: PCT/KR2019/017956
§ 371 (c)(1),
(2) Date: May 24, 2022

(87) PCT Pub. No.: WO2021/125379
PCT Pub. Date: Jun. 24, 2021

(65) Prior Publication Data
US 2023/0007118 A1    Jan. 5, 2023

(51) Int. Cl.
*G06V 40/20*    (2022.01)
*G06F 1/16*     (2006.01)
(Continued)

(52) U.S. Cl.
CPC ...... *H04M 1/72454* (2021.01); *G06F 1/1624* (2013.01); *G06F 1/1652* (2013.01);
(Continued)

(58) Field of Classification Search
CPC ............................ G06F 1/1624; G06F 1/1625
See application file for complete search history.

(56) References Cited

U.S. PATENT DOCUMENTS

| | | |
|---|---|---|
| 2011/0176260 A1 | 7/2011 | Walters et al. |
| 2014/0211399 A1 | 7/2014 | O'Brien |
| | (Continued) | |

FOREIGN PATENT DOCUMENTS

| | | |
|---|---|---|
| JP | 2018-049585 | 3/2018 |
| KR | 20160087460 A * | 7/2016 |
| | (Continued) | |

OTHER PUBLICATIONS

PCT International Application No. PCT/KR2019/017956, Written Opinion and International Search Report dated Sep. 17, 2020, 9 pages.

*Primary Examiner* — Kevin Kim
(74) *Attorney, Agent, or Firm* — LEE, HONG, DEGERMAN, KANG & WAIMEY

(57) ABSTRACT

A mobile terminal comprises: a body frame that is expandable in a first direction and shrinkable in a second direction; a flexible display in which the area of a display unit positioned on the front surface of the body frame is expanded according to the expansion of the body frame; a driving unit that changes the size of the body; a sensing unit that senses a user command; and a control unit that controls the driving unit to expand or shrink the body frame on the basis of the user command sensed by the sensing unit. Thus, a screen of the display unit positioned on the front surface can be expanded through size adjustment. Because a part of the screen always faces the outside, a separate secondary display unit is not required, and the screen may be expanded step by step as needed.

9 Claims, 13 Drawing Sheets

(a)

(b)

(51) Int. Cl.
  *G06F 3/01*      (2006.01)
  *G06F 3/16*      (2006.01)
  *G06F 21/31*     (2013.01)
  *G06F 21/44*     (2013.01)
  *H04M 1/02*      (2006.01)
  *H04M 1/72454*   (2021.01)

(52) U.S. Cl.
  CPC .............. *G06F 3/017* (2013.01); *G06F 3/167* (2013.01); *G06F 21/31* (2013.01); *G06F 21/44* (2013.01); *G06V 40/28* (2022.01); *H04M 1/0237* (2013.01); *H04M 1/0268* (2013.01); *H04M 2201/38* (2013.01)

(56) References Cited

U.S. PATENT DOCUMENTS

2014/0247229 A1* 9/2014 Cho ...................... G06F 1/1652
                                                      345/173
2019/0384438 A1* 12/2019 Park ...................... G06F 3/0482

FOREIGN PATENT DOCUMENTS

| KR | 10-2017-0012628 | 2/2017 |
| KR | 10-2017-0058223 | 5/2017 |

* cited by examiner

FIG. 3
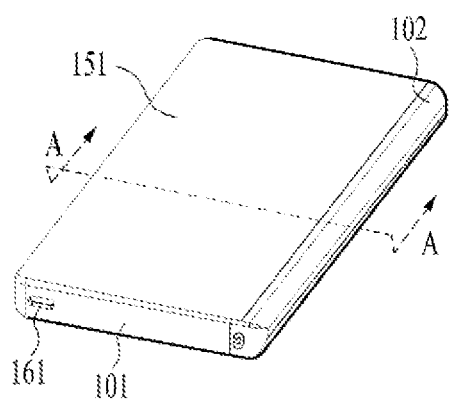
(a)
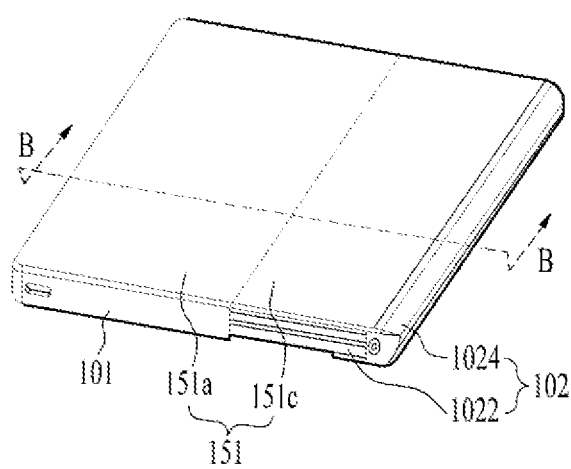
(b)

FIG. 4
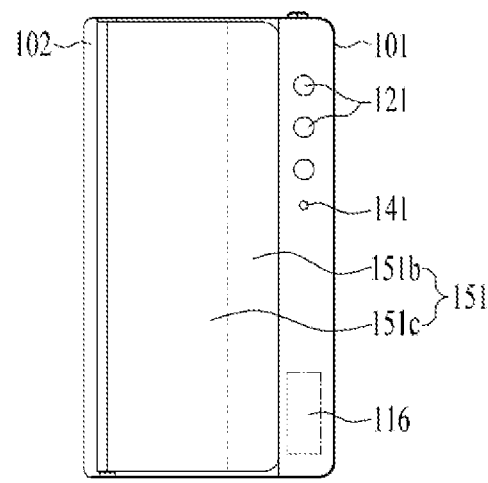
(a)
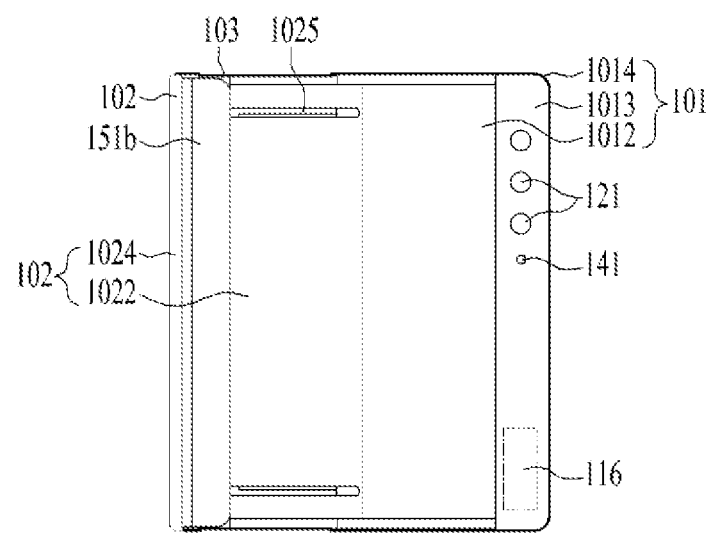
(b)

FIG. 5
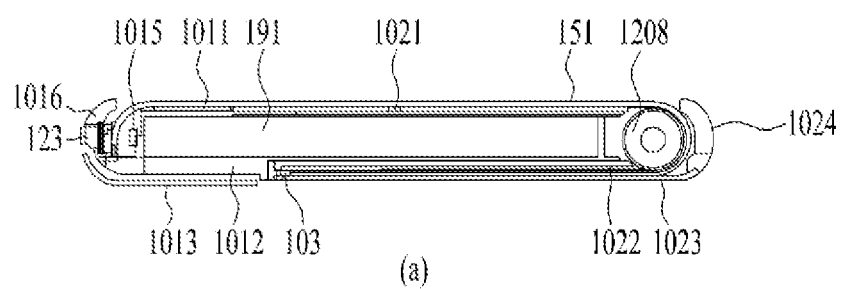
(a)
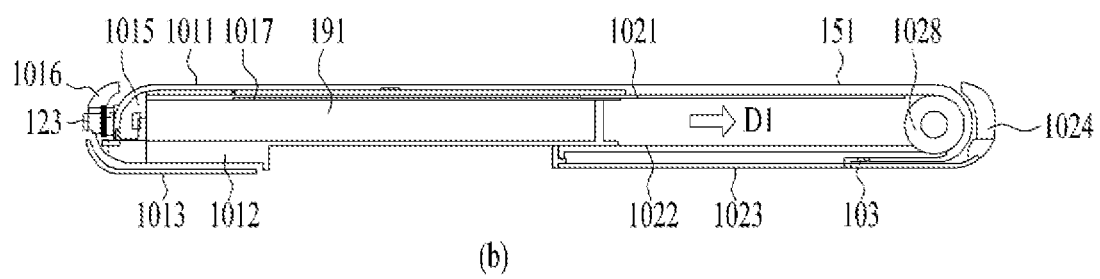
(b)

FIG. 6
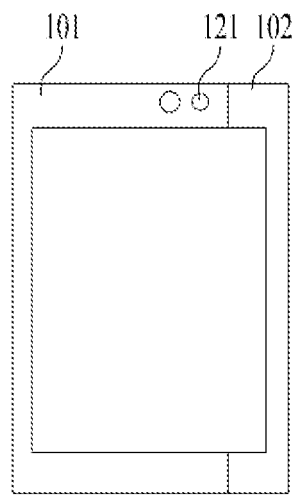
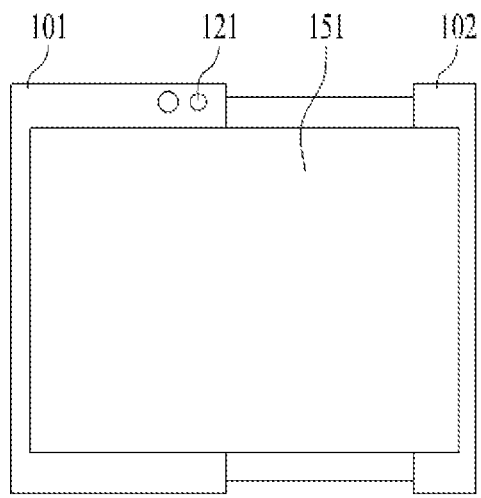
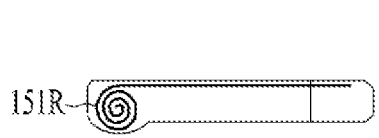
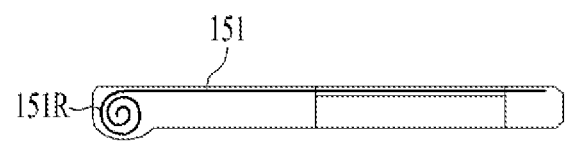
(a-1)  (b-1)
(a-2)  (b-2)

FIG. 13
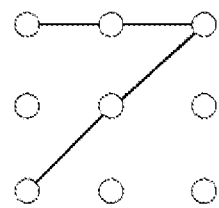
(a-1)
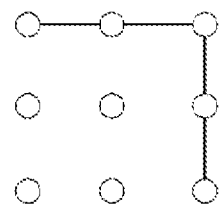
(a-2)
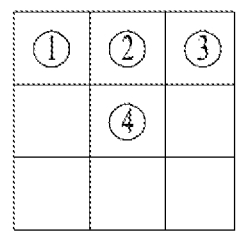
(b-1)
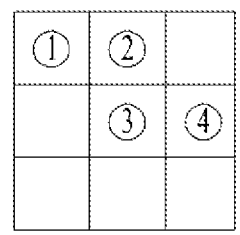
(b-2)
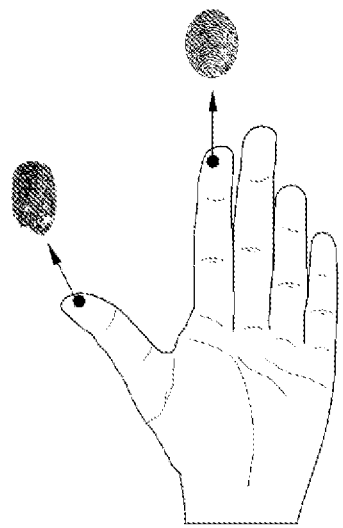
(c)

MOBILE TERMINAL

CROSS-REFERENCE TO RELATED APPLICATIONS

This application is the National Stage filing under 35 U.S.C. 371 of International Application No. PCT/KR2019/017956, filed on Dec. 18, 2019, the contents of which is hereby incorporated by reference herein in its entirety.

TECHNICAL FIELD

The present disclosure relates to a mobile terminal, and more particularly, to a mobile terminal that has a flexible display and is capable of extending a size of a screen while the display is scrolled and slid at the same time.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. In the mobile terminal having such a variable structure, a change in the structure of the mobile terminal must be performed stably. Further, a support structure and the like of the variable display unit may be a problem.

DISCLOSURE

Technical Problem

One purpose of the present disclosure is to provide a mobile terminal that may improve durability of a flexible display unit by not restricting a point where the flexible display unit is bent to a specific position.

Another purpose of the present disclosure is to provide a mobile terminal including a support structure of a flexible display unit that may stably support the flexible display unit when the flexible display unit is extended.

Another purpose of the present disclosure is to prevent a flexible display unit from being damaged by an external impact on a side where the flexible display unit is bent.

Technical Solutions

Provided is a mobile terminal including a body frame expandable in a first direction and contractible in a second direction, a flexible display unit whose area located on a front face of the body frame is expanded as the body frame is expanded, a driving unit for changing a size of the body frame, a sensing unit for sensing a user command, and a controller that controls the driving unit so as to expand or contract the body frame based on the user command sensed by the sensing unit.

The sensing unit may include a camera, the user command may include a first gesture and a second gesture of a user, and the controller may expand the body frame in the first direction when the first gesture is sensed, and contract the body frame in the second direction when the second gesture is sensed.

The second gesture may include a motion opposite to a motion of the first gesture.

The second gesture may be the same as the first gesture, and
  the controller may expand the body frame by recognizing the sensed gesture as the first gesture when the body frame is contracted, and contract the body frame by recognizing the sensed gesture as the second gesture when the body frame is expanded.

The sensing unit may include a microphone, the user command may include a first voice and a second voice of a user, and the controller may expand the body frame in the first direction when the first voice is sensed, and contract the body frame in the second direction when the second voice is sensed.

A first user command may be generated when a screen provided by the display unit has a horizontal length larger than a vertical dimension or when switching to a map screen, and the controller may expand the body frame in response to the first user command.

The controller may activate the display unit when the sensing unit senses a first unlocking command, and expand the body frame and at the same time activate the display unit when the sensing unit senses a second unlocking command.

The first unlocking command and the second unlocking command may include one of a knock code of continuously tapping a specified region of the display unit within a reference time, a touch pattern, and a fingerprint recognition.

The display unit may contain a flexible material wound a plurality of times at one side of the body frame, and, when the body frame is expanded, the number of windings of the display unit may decrease.

The display unit may include a front face positioned on the front face of the body frame and a rear face surrounding one side of the body frame and positioned on a rear face of the body frame, when the body frame is expanded, an area of the front face may increase and an area of the rear face may decrease, and, when the body frame is contracted, the area of the front face may decrease and the area of the rear face may increase.

Advantageous Effects

The mobile terminal of the present disclosure may adjust the size thereof to expand the screen of the display unit located on the front face thereof. Because a portion of the screen always faces the outside, there is no need for a separate secondary display unit, and the screen is able to be expanded step by step as needed.

The mobile terminal may be expanded via the simple user input, and the controller may increase user convenience by controlling the screen to have an appropriate size based on a function executed in the mobile terminal.

At the same time as the unlocking, the user may easily expand the display unit, so that a task that used to take two steps may be simplified into one step.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 3 shows perspective views respectively illustrating a first state and a second state viewed from one side of a mobile terminal according to one embodiment;

FIG. 4 shows rear face views respectively illustrating a first state and a second state of a mobile terminal according to one embodiment;

FIG. 5 shows cross-sectional views respectively taken along a line A-A and a line B-B of FIG. 3;

FIG. 6 is a diagram showing another embodiment of a mobile terminal;

FIG. 13 is a diagram illustrating a first unlocking command and a second unlocking command according to the control method in FIG. 12.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
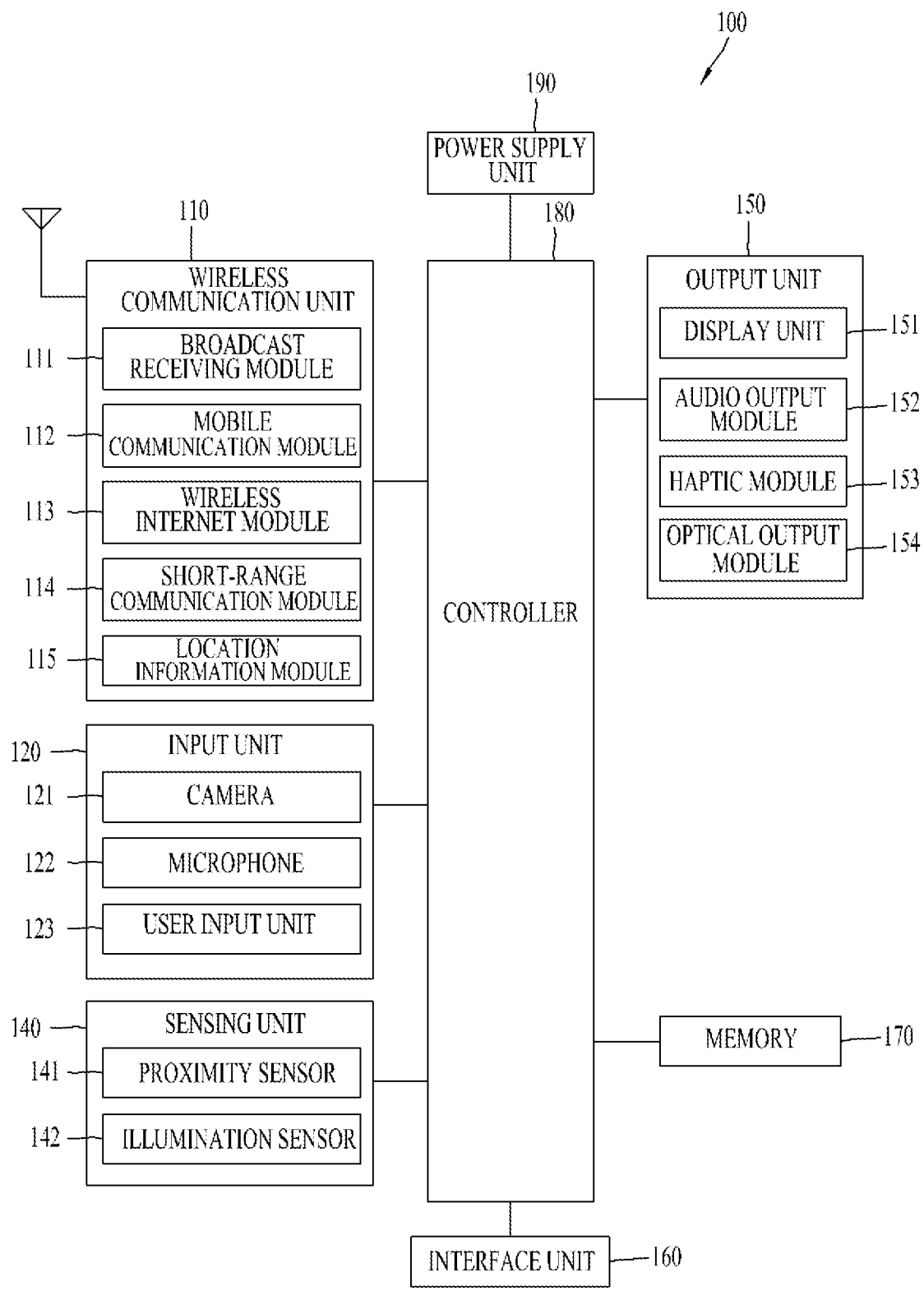
FIG. 1 is a block diagram of a mobile terminal in accordance with the present disclosure.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
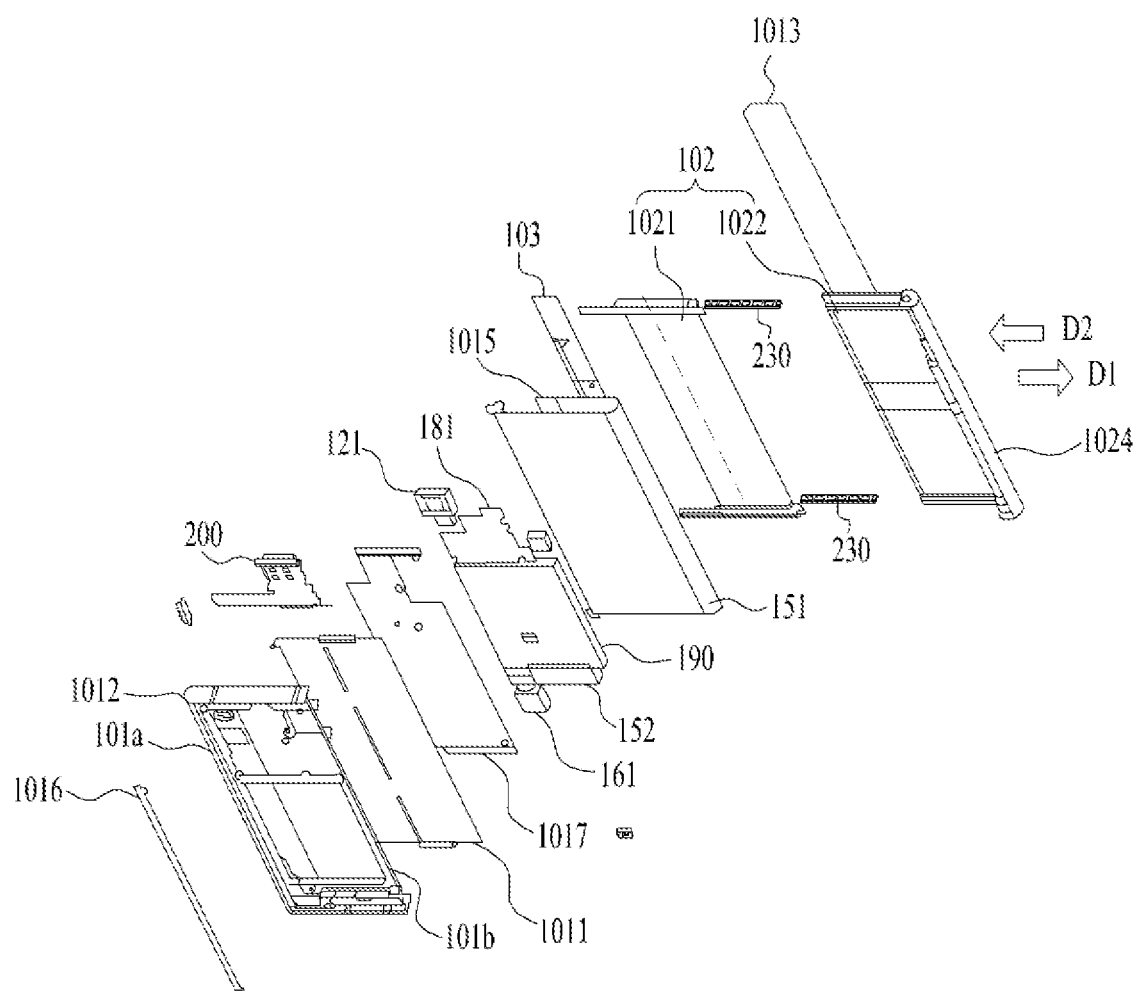
FIG. 2 is an exploded perspective view of a mobile terminal according to one embodiment.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3A, 4A, and 5A show a first state of the mobile terminal, and FIGS. 3B, 4B, and 5B show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, a size of the mobile terminal 100 and a size of the front face of the display unit 151 become larger than that in the first state as shown in FIG. 3B, and a size of the rear face of the display unit 151 is reduced as shown in FIG. 4B. That is, the display unit 151 positioned on the rear face of the mobile terminal 151 in the first state moves to the front face of the mobile terminal 100 in the second state.

In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on a side of the mobile terminal 100 in the first direction. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the body frame of the mobile terminal 100, but a portion where the antenna is installed in the body frame may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other. Thus, the mobile terminal 100 may have a hexahedral outer shape by such coupled first and second frames 101 and 102.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a side portion 1014. The side portion 1014 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

The fixed portion is coupled to the first frame of the display unit and is always positioned on the front face of the display unit to form a portion of the front face of the display unit. The variable portion includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion may be the front face and another portion of the variable portion may be the rear face based on the first and second states. The variable portion is positioned in the first direction with respect to the fixed portion relative to the mobile terminal, and an end of the variable portion is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 4, the first rear portion 1012 of the mobile terminal 100 includes an exposed rear portion 1013 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1013. The first rear portion 1012 except for the exposed rear portion 1013 may be covered by the display unit 151 in the first state as shown in FIG. 4A, and may be exposed rearwardly in the second state as shown in FIG. 4B.

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor, the audio output module, and the like may be positioned on the exposed rear portion 1013, and an antenna 116 may be installed on the exposed rear portion 1013. In order to protect the camera, the sensor, and the like of the exposed rear portion 1013 and in consideration of a design of an outer shape thereof, an exposed decor 1013 may be attached on the exposed rear portion 1013.

The side portion 1014 may extend along edges of the first front portion 1011 and the first rear portion 1012 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the side portion in the first direction, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon.

Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side portion 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract the size of the mobile terminal 100 itself, particularly the front face of the mobile terminal 100 by the extension and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the second rear portion 1022 of the second frame 102, the second side edge 151e may is be coupled the second rear portion 1022 of the second frame 102 to be movable in the first and second directions D1 and D2. In addition, since the display unit 151 is not structurally strong, a slide frame 103 may be coupled to the second side edge 151e. The slide frame 103 may be formed of a plate-shaped member extending in the longitudinal direction of the mobile terminal 100.

Accordingly, the second frame 103 may be coupled to the second frame, that is, the second rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the slide frame 103 may be stably moved while being guided by the slot 1025. The slide frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 151a extending from one side thereof, that is, the first side edge 151d toward the opposite second side edge 151e by a predetermined length, and a second region 151b disposed opposite the first region 151a, and extending from the second side edge 151e toward the first side edge 151d by a predetermined length. In addition, the display unit 151 may include a third region 151c disposed between the first and second regions 151a and 151b. Such first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the roller 1028. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c in the direction of the second side edge 151e and may be disposed on the rear face of the mobile terminal 100, more specifically, on the second frame, that is, the rear face of the second rear portion 1022 thereof. The second region 151b may be coupled to the slide frame 103 without being directly coupled to the second frame 102. As shown in FIG. 4B, the slot 1025 extending in the lateral direction (i.e., the direction perpendicular to the longitudinal direction of the mobile terminal 100) to the second frame 102, that is, to the second rear portion 1022 is defined. Further, the slide frame 103 may move along the slot 1025. In FIG. 4B, it is shown that the slot 1025 is defined in the rear face of the second frame 102, but may be defined in the side face of the second frame 102.

Although the second region 151b may move in the first or second direction D1 or D2 with respect to the second frame 102 together with the slide frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4B, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 1028 and bent in the second frame 102. When converting from the first state to the second state, the third region 151c may extend from the second frame 102 to the front face of the mobile terminal 100 while being rolled on the roller 1028 in one direction. On the other hand, when converting from the second state to the first state, the third region 151c may be retracted from the front face of the mobile terminal 100 to the second frame 102 while being rolled on the roller 1028 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1023 may be further disposed on a rear face of the second rear portion 1022 such that the rear face of the display unit positioned on the rear face of the mobile terminal 100 is not exposed to the outside. The rear face of the display unit may be used in the first state when the rear face cover 1023 uses a transparent material, and the rear face of the display unit may be covered such that the movement of the slide frame 103 is not exposed when the rear face cover 1023 uses an opaque material. That is, the second region and the third region of the slide frame 103 and the display unit 151 may move in the first direction and in the second direction in a space between the second rear portion 1022 and the rear face cover 1023. The exposed decor 1013 may be further attached to the exposed rear portion of the first rear portion 1012 to protect the camera 121, the sensor 140, and the like. The exposed decor 1013 may be partially coated on a plate-shaped member made of a transparent glass material to cover the internal components, and may be not coated only on a required portion to allow light to reach the camera 121, the flash or the sensing unit 140, and the like.

It is difficult to connect the side frame 1024, which is located on a side face in the first direction on which the second frame 102 is located, with a interior of the mobile terminal directly, so that it is difficult to dispose an user input unit. Accordingly, a user input unit 123 such as a volume button may be disposed on a side face adjacent the first frame 101 in the second direction.

FIG. 6 is a diagram showing another embodiment of the mobile terminal 100. As described above, the display unit 151 may be bent while surrounding the body frames 101 and 102 of the mobile terminal 100 to include the front face and the rear face, but may be constructed in a form including a wound portion 151R wound a plurality of times at one side of the display unit 151. When the body frames 101 and 102 are expanded in the first direction to be in the second state, as the number of windings of the wound portion 151R of the display unit 151 is reduced, an area of the display unit 151 positioned on the front face of the mobile terminal 100 is expanded. Conversely, when the sizes of the body frames 101 and 102 are reduced again, as the wound portion 151R is rewound, the area of the display unit 151 positioned on the front face of the mobile terminal 100 may be reduced.

A member for supporting the expanded rear face of the display unit 151 may be required, and a plurality of support bars may be arranged side by side in the first direction so as to have rigidity in the third direction although being able to be bent in the first direction. Alternatively, a foldable support structure that is unfolded with the expansion of the mobile terminal 100 may be used.

The sizes of the body frames 101 and 102 may vary by the driving unit, but the user may expand the sizes of the body frames 101 and 102 by pulling the second frame 102 directly. In this regard, a protrusion convexly protruding from a rear face of the wound portion may be included so as to be gripped by the user to facilitate the pulling of the second frame 102 from the first frame 101 in the first direction. The protrusion is a space in which the wound portion of the display unit 151 is disposed, and at the same time, serves as a hook for the user to stably grip the first frame 101 when pulling the second frame 102 to change the state of the mobile terminal 100 to the second state.

Figure 7:
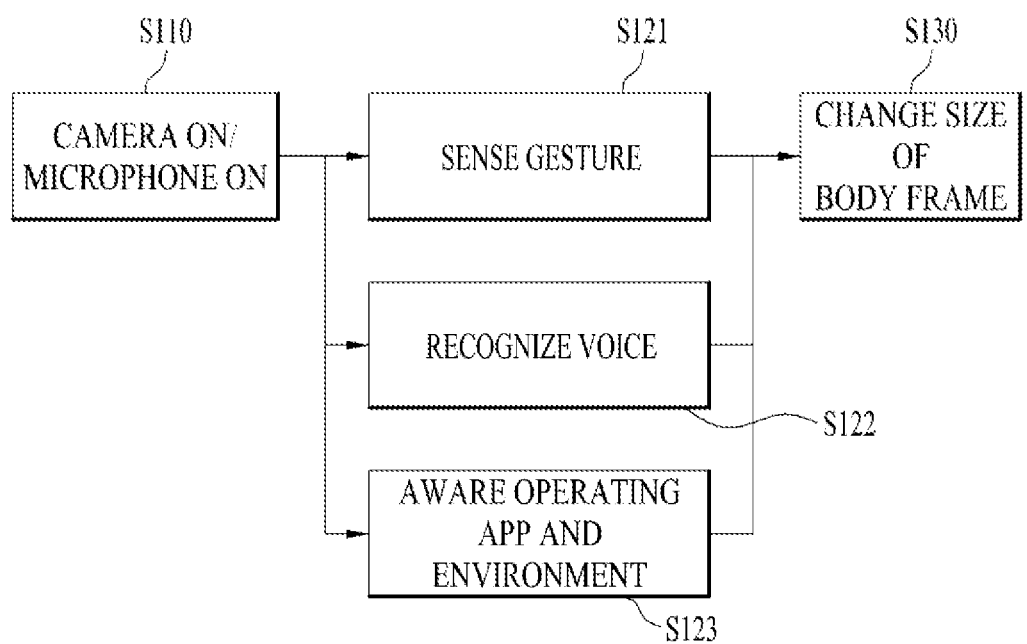
FIG. 7 is a flowchart showing a method for controlling a mobile terminal.
Figure 8:
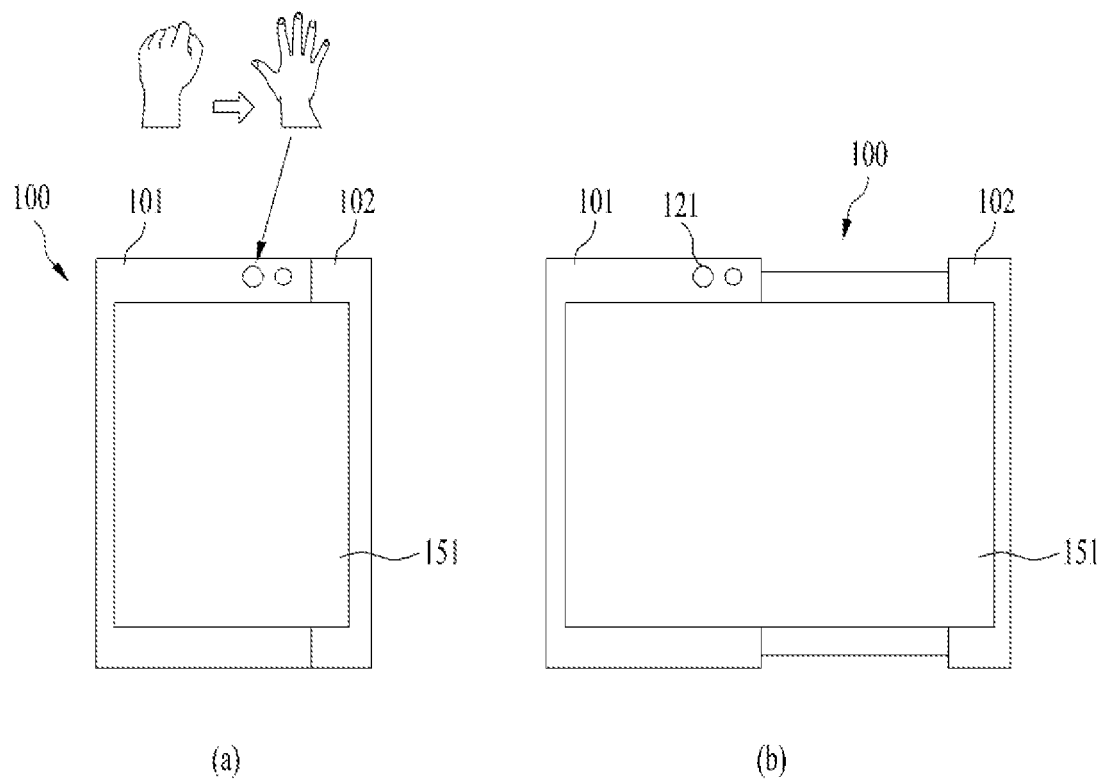
FIGS. 8 and 9 are diagrams showing state changes of a mobile terminal according to a control method in FIG. 7.
Figure 9:
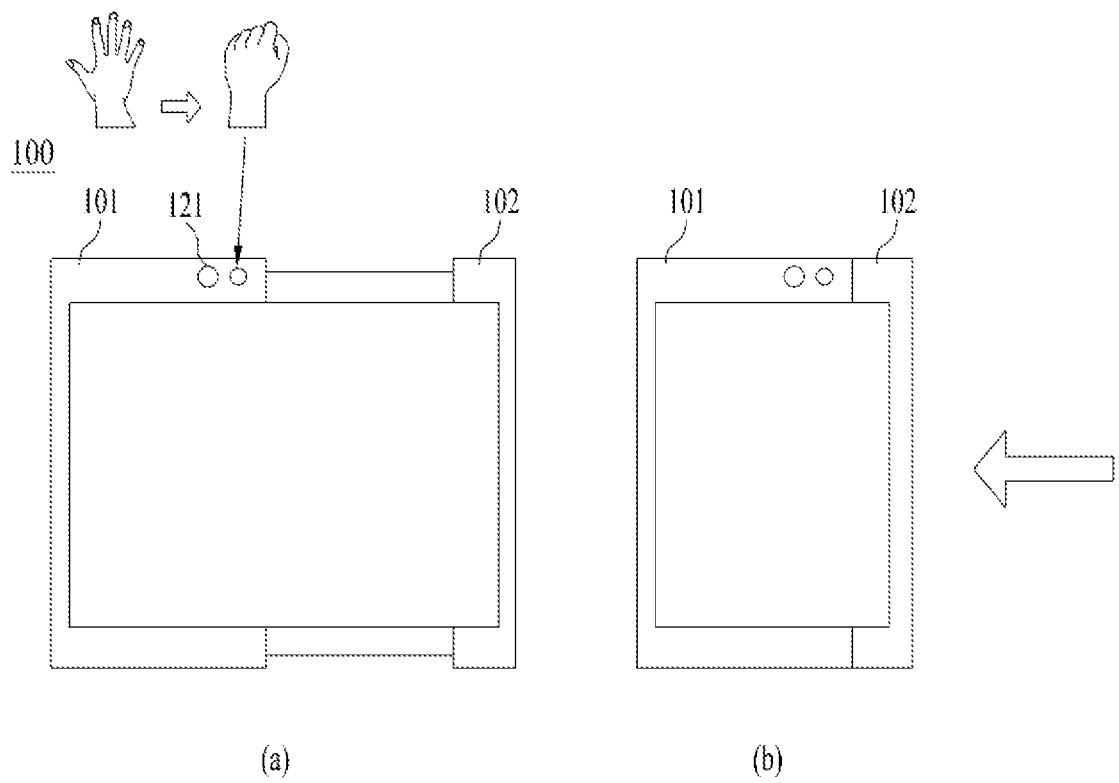

FIG. 7 is a flowchart showing a method for controlling the mobile terminal 100, and FIGS. 8 and 9 are diagrams showing state changes of the mobile terminal 100 according to the control method in FIG. 7. When a user command is sensed (S121, S122, and S123), the expandable mobile terminal 100 may change the sizes of the body frames 101 and 102 (S130). The user command may be of various types, and there may be various types of sensing units that collect the user command.

For example, when a hand motion (a gesture) of the user is the user command, the gesture may be identified using the camera 121. In this case, the camera 121 may be activated (S110) to sense the gesture (S121).

A motion of the user opening the hand from a clenched state as shown in FIG. 8 will be referred to as a first gesture, and a motion of the user of clenching the hand from the open state as shown in FIG. 9 will be referred to as a second gesture. When the camera 121 senses the first gesture, as the second frame 102 moves in the first direction, the size of the mobile terminal 100 may be expanded and the area of the display unit 151 located on the front face of the mobile terminal 100 may also be expanded. When the camera 121 senses the second gesture, as the second frame 102 moves in the second direction, the size of the mobile terminal 100 may be reduced and the area of the display unit 151 located on the front face of the mobile terminal 100 may be reduced.

As shown in FIGS. 8 and 9, the first gesture and the second gesture may be motions opposite to each other. In the same case, when the gesture is sensed in the state in which the mobile terminal 100 is contracted (the first state), the gesture may be determined as the first gesture and the mobile terminal 100 may be expanded (the second state). Conversely, when the gesture is sensed in the state in which the mobile terminal 100 is expanded, the gesture may be determined as the second gesture and the mobile terminal 100 may be contracted.

The user command may be a voice command collected from the microphone other than the gesture. For example, when the microphone is activated (S110) and the microphone recognizes a voice command "Expand the screen" (S122), the controller 180 may convert the state of the mobile terminal 100 from the first state to the second state (S123). Conversely, when recognizing "contract the screen", the controller 180 may convert the state of the mobile terminal 100 from the second state to the first state and the area of the display unit 151 located on the front face of the mobile terminal 100 may be reduced.

In addition, the user command may be an operation of selecting a button on the display unit 151, an operation of pressing the user input unit, and execution of a specified function, and the size of the mobile terminal 100 may change when the user command is recognized.

Figure 10:
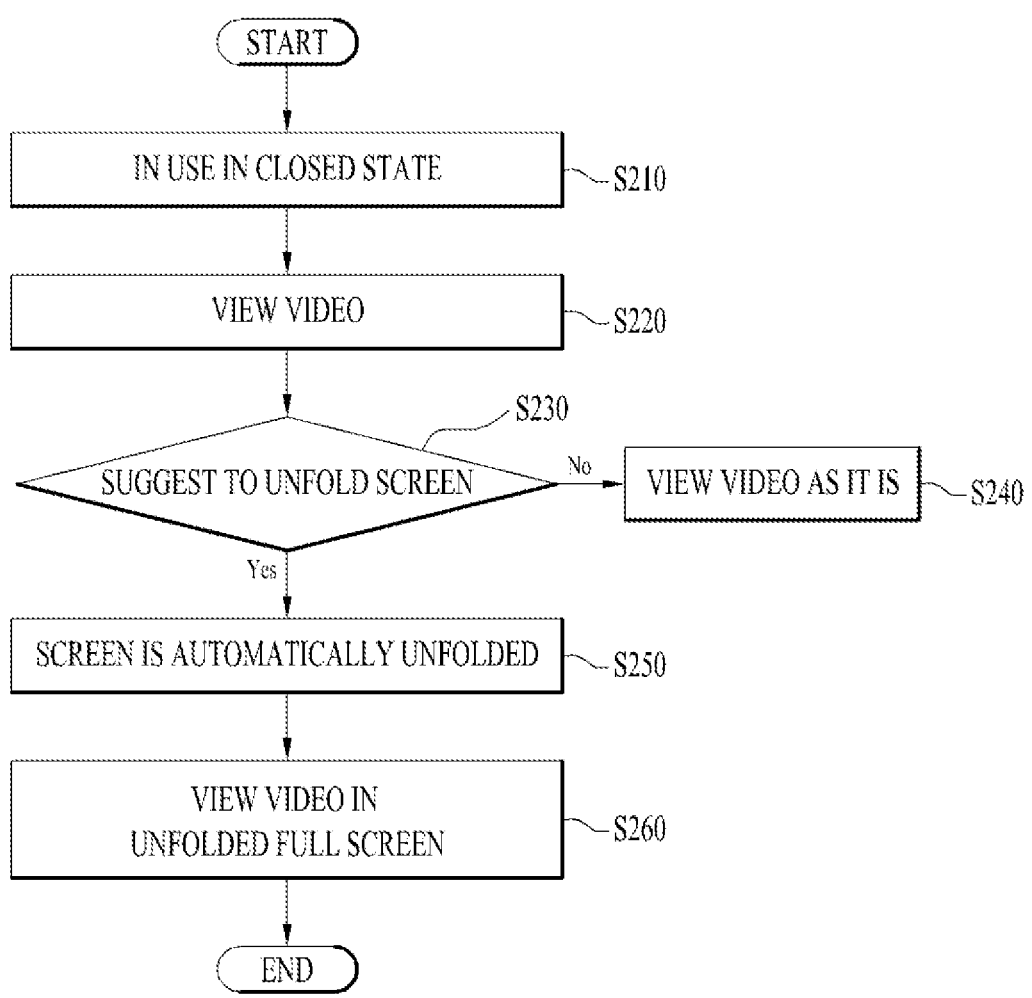
FIG. 10 is a flowchart showing another method for controlling a mobile terminal.
Figure 11:
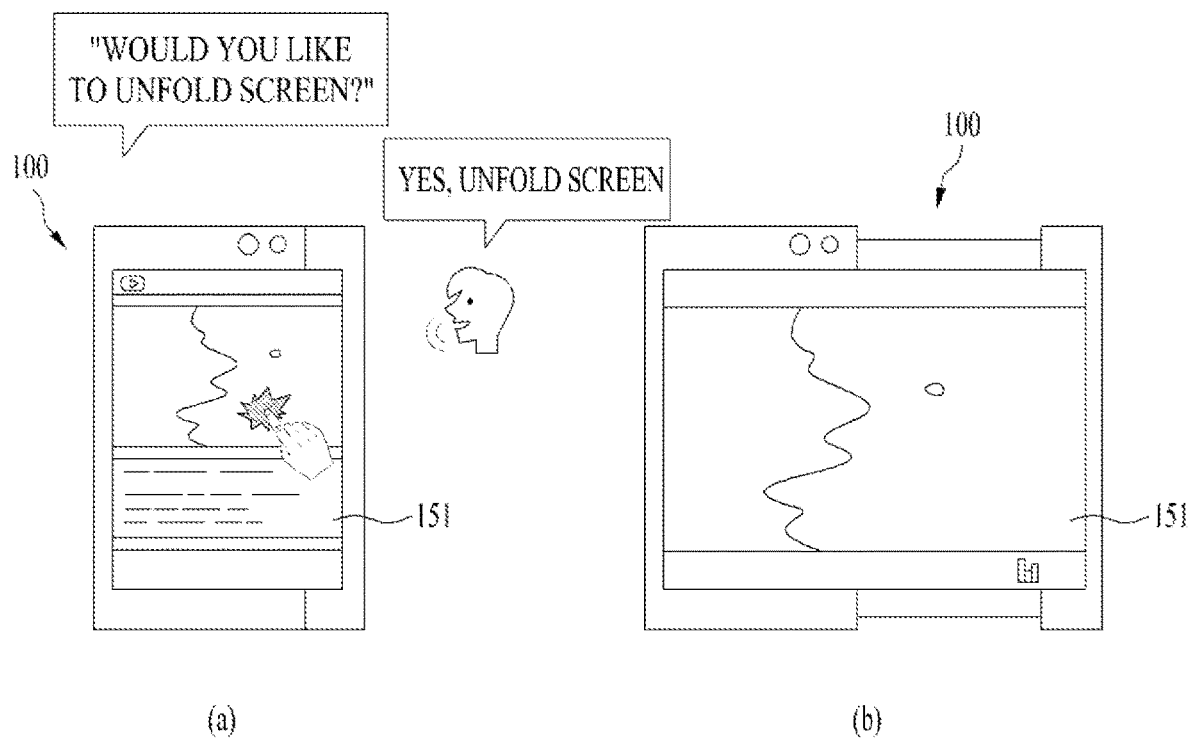
FIG. 11 is a diagram showing a state change of a mobile terminal according to a control method in FIG. 10.

FIG. 10 is a flowchart showing another method for controlling the mobile terminal 100, and FIG. 11 is a diagram showing a state change of the mobile terminal 100 according to the control method in FIG. 10. When a screen ratio is changed while the mobile terminal 100 is in use, the mobile terminal 100 may be automatically expanded. For example, when the user selects and plays a specific video (S220) on a screen in which menus are vertically listed in the first state of the mobile terminal 100 (S210), because the video generally provides a screen with a horizontal length greater than a vertical length, there is a problem in that, in the first state as shown in (a) in FIG. 11, the screen is distorted, or the video has to be viewed in a small screen when the video is provided based on the horizontal length.

Therefore, when a screen whose vertical length is larger than a horizontal length thereof is switched to a screen whose horizontal length is larger than a vertical length thereof, the controller 180 may suggest the user to change the state of the mobile terminal 100 (S230). The suggestion may be provided as voice or via a pop-up window. When the user accepts the suggestion of the controller 180, the mobile terminal 100 may be expanded as shown in (b) in FIG. 11 and the video may be viewed on a wide screen (S250 and S260). When the suggestion is not accepted, the size of the mobile terminal 100 does not change and the video may be viewed in a small size as it is (S240).

Figure 12:
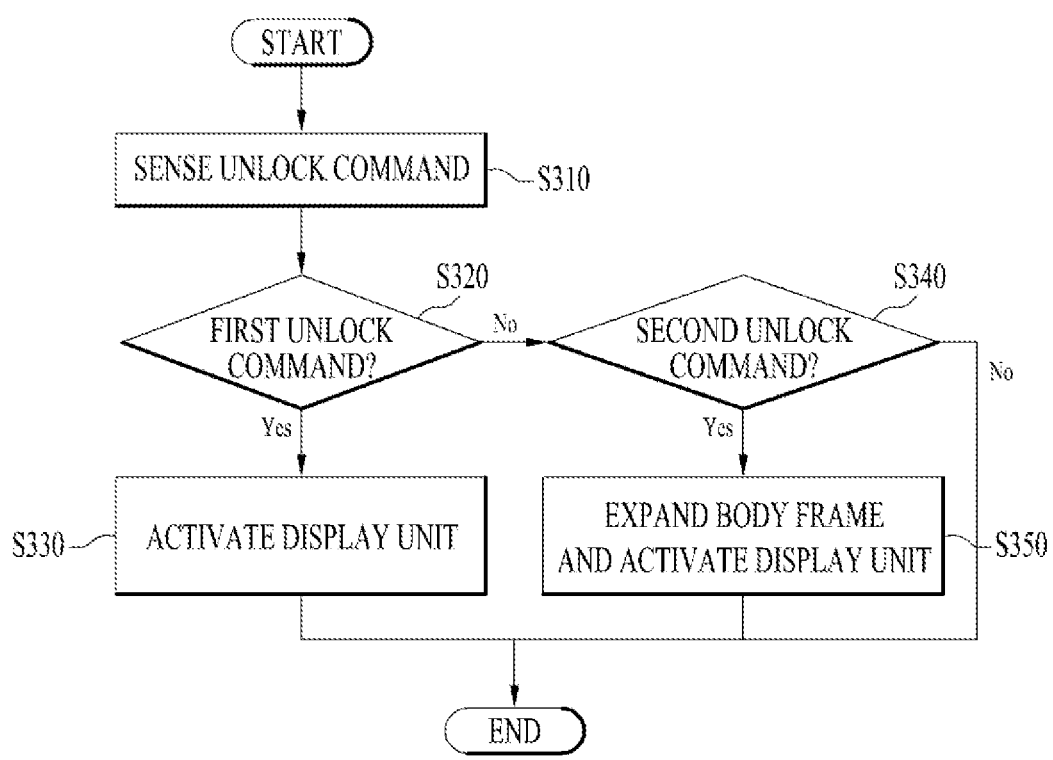
FIG. 12 is a flowchart showing another method for controlling a mobile terminal.

FIG. 12 is a flowchart showing another method for controlling the mobile terminal 100, and FIG. 13 is a diagram illustrating a first unlocking command and a second unlocking command according to the control method in FIG. 12.

When the mobile terminal 100 is in an inactive state or in a standby state, the state of the mobile terminal 100 may be switched to a locked state for personal information protection and security. In order to release the locked state, the user may input an unlocking command to switch the state of the mobile terminal 100 back to the active state. When the mobile terminal 100 is in the active state, the entire display unit 151 may be turned on each application may be executed from a state in which the display unit 151 is turned off or only some information is being provided.

However, in the case of the mobile terminal 100 in which the size of the display unit 151 located on the front face thereof may be adjusted as the size of the mobile terminal 100 changes as in the present disclosure, the size of the mobile terminal 100 may change simultaneously with the unlocking in addition thereto. By setting unlock commands differently, the user may select one of an unlocking method of simply activating the display unit 151 and using the mobile terminal 100 in the first state and an unlocking method of activating the display unit 151 and simultaneously switching the state of the mobile terminal 100 from the first state to the second state.

When the unlock command is sensed (S310), the controller 180 determines whether the unlock command is a first unlocking command or a second unlocking command (S320 and S340). When the unlock command is the first unlocking command, the locked state may be released while activating only the display unit 151 without changing the size of the mobile terminal 100. When the unlock command is the second unlock command, the locked state may be released while activating the display unit 151, and at the same time, the body frames 101 and 102 may be expanded to switch the state of the mobile terminal 100 to the second state.

The unlocking command may be a pattern touch that connects a plurality of dots located on the display unit 151 with each other as shown in (a-1) and (a-2) in FIG. 13, and (a-1) may be the first unlocking command and (a-2) may be the second unlocking command. Alternatively, the screen of the display unit 151 may be divided into predetermined regions and the unlocking command may be set via a pattern of touching each divided region. (b-1) in FIG. 13 shows an example of the first unlocking command, and (b-2) shows an example of the second unlocking command.

Recently, the unlocking may be performed based on biometric information of the user, and fingerprints may be set as many as the number of fingers, so that a fingerprint of a thumb may be set as the first unlocking command and a fingerprint of an index finger may be set as the second unlocking command.

The mobile terminal 100 of the present disclosure may adjust the size thereof to expand the screen of the display unit 151 located on the front face thereof. Because a portion of the screen always faces the outside, there is no need for a separate secondary display unit 151, and the screen is able to be expanded step by step as needed.

The mobile terminal 100 may be expanded via the simple user input, and the controller 180 may increase user convenience by controlling the screen to have an appropriate size based on a function executed in the mobile terminal 100.

At the same time as the unlocking, the user may easily expand the display unit 151, so that a task that used to take two steps may be simplified into one step.

The above detailed description should not be construed as restrictive in all respects and should be considered as illustrative. The scope of the present disclosure should be determined by a reasonable interpretation of the appended claims, and all changes within the equivalent scope of the present disclosure are included in the scope of the present disclosure.

What is claimed is:

1. A mobile terminal comprising:
a body frame expandable in a first direction and contractible in a second direction;
a flexible display unit whose area located on a front face of the body frame is expanded as the body frame is expanded;
a driving unit for changing a size of the body frame;
a sensing unit for sensing a user command; and
a controller configured to control the driving unit so as to expand or contract the body frame based on the user command sensed by the sensing unit,
wherein the controller is configured to:
activate the display unit when the sensing unit senses a first command; and
expand the body frame and at the same time activate the display unit when the sensing unit senses a second command.

2. The mobile terminal of claim 1, wherein the sensing unit includes a camera,
wherein the user command includes a first gesture and a second gesture of a user,
wherein the controller is configured to:
expand the body frame in the first direction when the first gesture is sensed; and
contract the body frame in the second direction when the second gesture is sensed.

3. The mobile terminal of claim 2, wherein the second gesture includes a motion opposite to a motion of the first gesture.

4. The mobile terminal of claim 2, wherein the second gesture is the same as the first gesture,
wherein the controller is configured to:
expand the body frame by recognizing the sensed gesture as the first gesture when the body frame is contracted; and
contract the body frame by recognizing the sensed gesture as the second gesture when the body frame is expanded.

5. The mobile terminal of claim 1, wherein the sensing unit includes a microphone,
wherein the user command includes a first voice and a second voice of a user,
wherein the controller is configured to:
expand the body frame in the first direction when the first voice is sensed; and
contract the body frame in the second direction when the second voice is sensed.

6. The mobile terminal of claim 1, wherein a first user command is generated when a screen provided by the display unit has a horizontal length larger than a vertical dimension or when switching to a map screen,
wherein the controller is configured to expand the body frame in response to the first user command.

7. The mobile terminal of claim 1, wherein the first unlocking command and the second unlocking command include one of a knock code of continuously tapping a specified region of the display unit within a reference time, a touch pattern, and a fingerprint recognition.

8. The mobile terminal of claim 1, wherein the display unit contains a flexible material wound a plurality of times at one side of the body frame,
wherein, when the body frame is expanded, the number of windings of the display unit decreases.

9. The mobile terminal of claim 1, wherein the display unit includes a front face positioned on the front face of the body frame and a rear face surrounding one side of the body frame and positioned on a rear face of the body frame,
wherein, when the body frame is expanded, an area of the front face increases and an area of the rear face decreases,
wherein, when the body frame is contracted, the area of the front face decreases and the area of the rear face increases.

* * * * *